US008080961B2

(12) United States Patent
Miller

(10) Patent No.: US 8,080,961 B2
(45) Date of Patent: Dec. 20, 2011

(54) SYSTEMS AND METHODS FOR ADJUSTING VEHICLE WINDOW POSITION

(76) Inventor: Timothy S. Miller, Campbell, CA (US)

( * ) Notice: Subject to any disclaimer, the term of this patent is extended or adjusted under 35 U.S.C. 154(b) by 719 days.

(21) Appl. No.: 12/187,836

(22) Filed: Aug. 7, 2008

(65) Prior Publication Data

US 2010/0032980 A1 Feb. 11, 2010

(51) Int. Cl.
*G05B 5/00* (2006.01)

(52) U.S. Cl. ......................... 318/466; 318/280; 318/283

(58) Field of Classification Search .................. 318/466, 318/468, 280, 283
See application file for complete search history.

(56) References Cited

U.S. PATENT DOCUMENTS 4,328,451 A * 5/1982 Barge ............................ 318/596
4,358,488 A * 11/1982 Dunklin et al. ................. 428/31
5,094,151 A * 3/1992 Bernard ........................ 454/131
5,222,661 A * 6/1993 Wenhart ....................... 236/49.3
5,801,501 A * 9/1998 Redelberger .................. 318/283
5,872,436 A * 2/1999 Bergmann et al. ............ 318/286
6,236,176 B1 * 5/2001 Uebelein et al. .............. 318/287
6,936,984 B2 * 8/2005 Wilson .......................... 318/280
2005/0017667 A1 * 1/2005 Yamamoto .................... 318/469

* cited by examiner

*Primary Examiner* — Rina Duda
(74) *Attorney, Agent, or Firm* — Fountainhead Law Group P.C.

(57) ABSTRACT

In one embodiment the present invention includes a vehicle window apparatus. The vehicle window apparatus comprises a position feature, a detector, a feature switch, and a motor. The position feature corresponds to a position of a vehicle window. The detector is coupled to use the position feature and is coupled to provide at least one signal corresponding to a movement of the vehicle window to a predetermined position. The feature switch is coupled to the detector. The motor is coupled to provide the movement of the vehicle window according to the signals provided by the detector. The movement results from the switching of the feature switch. The predetermined position is a position between a fully closed position and a fully open position.

22 Claims, 7 Drawing Sheets

SYSTEMS AND METHODS FOR ADJUSTING VEHICLE WINDOW POSITION

CROSS REFERENCE TO RELATED APPLICATIONS

Not Applicable

BACKGROUND

The present invention relates to vehicle windows, and in particular, to systems and methods for adjusting vehicle window position.

Unless otherwise indicated herein, the approaches described in this section are not prior art to the claims in this application and are not admitted to be prior art by inclusion in this section.

Automobiles and other vehicles are common place in today's society. In the advent of technology, many automated functions have been integrated into the design of modern vehicles. For example, many cars have cruise control, temperature control, and automatic seat adjustment. Although a large number of newly built automotive vehicles come with electric windows, there has not been much advancement in automated window settings.

Changing the window position is still done with manual switches. This may be annoying and cumbersome when travelling in a vehicle with a group. For example, on a hot sunny day each passenger of the group may have their windows adjusted manually to their own preference. When the group arrives at their destination, the driver may either need to remind each passenger to roll up their window before he turns off the car, or may use a driver's manual switches to shut each window. On a hot day, he may wish to leave the windows partially open to keep the interior of the car from heating up.

Current systems and methods which may be implemented for adjusting the position of vehicle windows may have problems. Automating window movement may be problematic due to concerns for safety. An automated window may shut on a small child's hand, for example. Utilizing microprocessors and safety controls may solve the safety problem but may also create a high cost or a reliability concern in its place.

Thus, there is a need for improved automated vehicle window adjustment. The present invention solves these and other problems by providing systems and methods for adjusting vehicle window position.

SUMMARY

Embodiments of the present invention improve systems and methods for adjusting vehicle window position. In one embodiment the present invention includes a vehicle window apparatus. The vehicle window apparatus comprises a position feature, a detector, a feature switch, and a motor. The position feature corresponds to a position of a vehicle window. The detector is coupled to use the position feature and is coupled to provide signals corresponding to a movement of the vehicle window to a predetermined position. The feature switch is coupled to the detector. The motor is coupled to provide the movement of the vehicle window according to the signals provided by the detector. The movement results from the switching of the feature switch. The predetermined position is a position between a fully closed position and a fully open position.

In one embodiment, the predetermined position of the vehicle window forms a partial opening that is less than one inch from the fully closed position In one embodiment, the position feature alters the transmission of light through at least one portion of the vehicle window, wherein other portions of the vehicle window, that do not have the position feature, pass light in a uniform manner.

In one embodiment, the position feature includes at least one opaque region.

In one embodiment, the at least one opaque region includes a decal, wherein the detector includes a light emitting diode.

In one embodiment, the position feature includes at least one etched region of the vehicle window.

In one embodiment, the invention further comprises a limiting circuit coupled between a voltage source and the motor. The limiting circuit alters attributes corresponding to the movement of the vehicle window.

In one embodiment, the position feature is a protrusion from the vehicle window.

In one embodiment, the detector includes a switch. The switch is switched into a first setting if the vehicle window moves in a closing direction out of the predetermined position. The switch is switched into a second setting if the vehicle window moves in the closing direction into the predetermined position. The switch is switched into a third setting if the vehicle window moves in an opening direction out of the predetermined position. The switch is switched into the second setting if the vehicle window moves in the opening direction into the predetermined position. The position feature movement is used to change the setting of the switch In one embodiment, the first position of the switch selectively provides power to the motor such that the vehicle window opens toward the predetermined position. The third position of the switch selectively provides power to the motor such that the vehicle window closes toward the predetermined position. The second position of the switch selectively provides no power to the motor such that the vehicle window stops moving.

In one embodiment, the detector includes a first switch and a second switch. The first switch is switched into a first setting if the vehicle window moves in a closing direction into the predetermined position. The second switch is switched into a first setting if the vehicle window moves in the closing direction out of the predetermined position. The first switch is switched into a second setting if the vehicle window moves in an opening direction out of the predetermined position. The second switch is switched into a second setting if the vehicle window moves in the opening direction into the predetermined position. The position feature movement is used to change the setting of the first switch and the second switch.

In one embodiment, the predetermined position has a tolerance associated with a distance between the first switch and the second switch.

In one embodiment the present invention includes an automotive vehicle. The automotive vehicle comprises a vehicle window system. The vehicle window system comprises a feature switch and a plurality of vehicle window apparatus. Each vehicle window apparatus comprises a position feature, a detector, and a motor. The position feature corresponds to a position of a vehicle window. The detector is coupled to use the position feature and is coupled to provide at least one signal corresponding to a movement of the vehicle window to a predetermined position. The motor is coupled to provide the movement of the vehicle window according to the at least one signal provided by the detector. The movement results from the switching of the feature switch. The predetermined position is a position between a fully closed position and a fully open position. The feature switch is coupled to the detector of each vehicle window apparatus. Each movement of each vehicle window occurs simultaneously.

In one embodiment the present invention includes a method for adjusting a vehicle window. The method comprises detecting, switching, and moving. The detecting includes detecting a position of a vehicle window using a position feature. The switching includes switching a feature switch. The moving includes moving the vehicle window to a predetermined position as a result of the switching of the feature switch. The moving corresponds to the position of the vehicle window. The predetermined position is a position between a fully closed position and a fully open position In one embodiment, the position feature alters the transmission of light through at least one portion of the vehicle window. Other portions of the vehicle window, that do not have the position feature, pass light in a uniform manner.

In one embodiment, the position feature reduces the transmission of light. The detecting further comprises sensing the light passing through the position feature at a location relative to a framework of a mechanism used in the moving of the vehicle window.

In one embodiment, the invention further comprises limiting the force of the moving of the vehicle window.

In one embodiment, the detecting includes switching a switch into a first setting if the vehicle window moves in a closing direction out of the predetermined position. The detecting further includes switching the switch into a second setting if the vehicle window moves in the closing direction into the predetermined position. The detecting further includes switching the switch into a third setting if the vehicle window moves in an opening direction out of the predetermined position. The detecting further includes switching the switch into the second setting if the vehicle window moves in the opening direction into the predetermined position. The position feature movement is used to change the setting of the switch.

In one embodiment, the detecting includes switching a first switch into a first setting if the vehicle window moves in a closing direction into the predetermined position. The detecting further includes switching a second switch into a first setting if the vehicle window moves in the closing direction out of the predetermined position. The detecting further includes switching the first switch into a second setting if the vehicle window moves in a opening direction out of the predetermined position. The detecting further includes switching the second switch into a second setting if the vehicle window moves in the opening direction into the predetermined position. The position feature movement is used to change the setting of the first switch and the second switch.

The following detailed description and accompanying drawings provide a better understanding of the nature and advantages of the present invention.

DETAILED DESCRIPTION

Described herein are techniques for systems and methods for adjusting vehicle window position. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
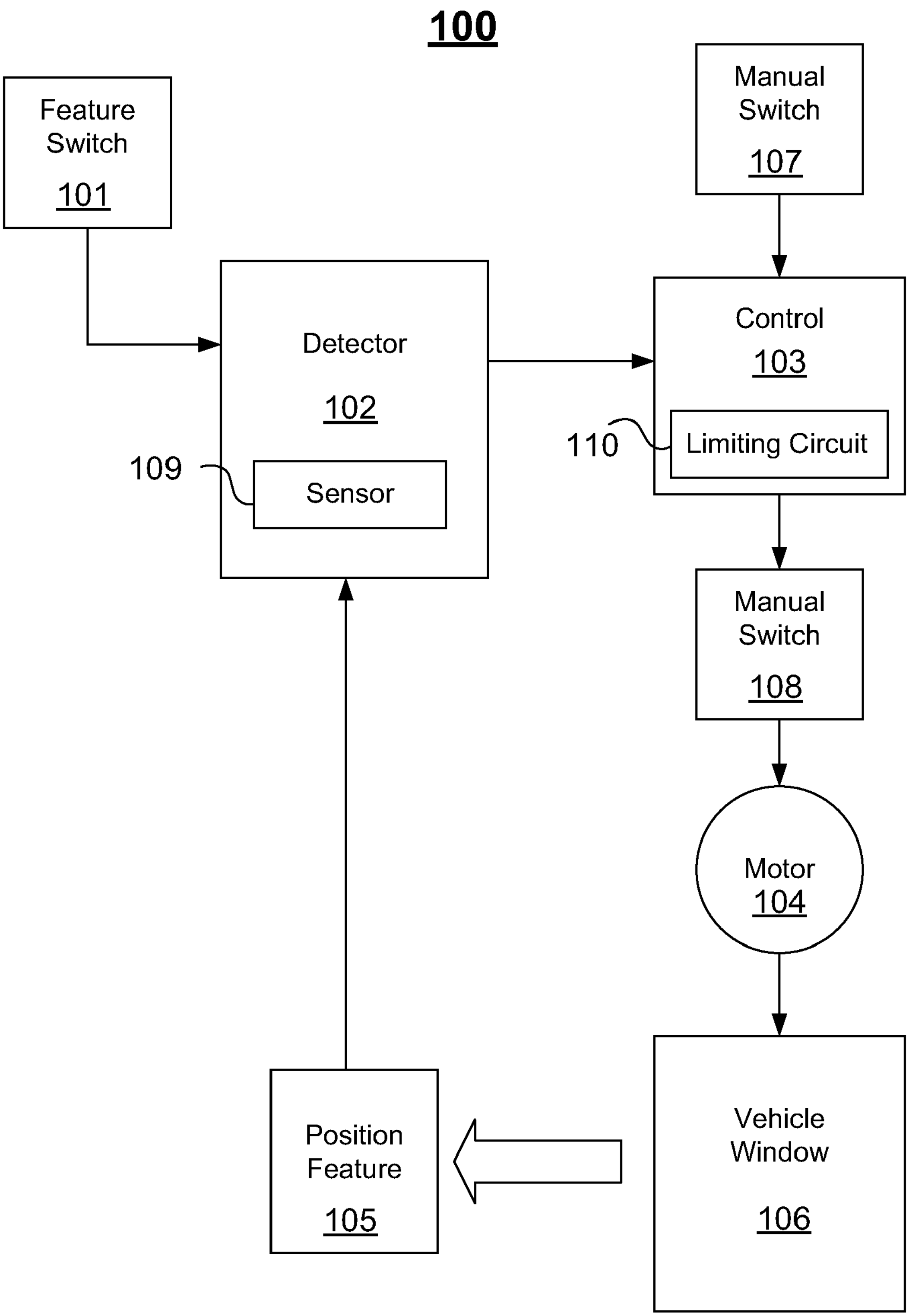
FIG. 1 illustrates a vehicle window apparatus according to one embodiment of the present invention.

FIG. 1 illustrates a vehicle window apparatus 100 according to one embodiment of the present invention. Vehicle window apparatus 100 includes feature switch 101, detector 102, control circuit 103, motor 104, position feature 105, vehicle window 106, manual switch 107, manual switch 108, sensor 109, and limiting circuit 110.

Vehicle apparatus 100 moves window 106 to a predetermined position. The predetermined position may be between the fully open position and the fully closed position. The predetermined position may form a partial opening that is less than one inch from the fully closed position. Feature switch 101 is coupled to detector 102. Control 103 is coupled to motor 104 to provide the movement of the vehicle window. The movement of the vehicle window to the predetermined position results from the switching of feature switch 101. Detector 102 may have sensor 109 that senses position feature 105. Position feature 105 corresponds to the position of vehicle window 106. Detector 102 provides signals which correspond to a movement of the vehicle window that may place the vehicle window into the predetermined position. For example, if the window is opened farther than the predetermined position, detector may provide signals corresponding to the position such that control 103 drives motor 104 to close the window toward the predetermined position. Once the window arrives at the predetermined position, position feature 105 may communicate to detector 102 that the vehicle window 106 is at the predetermined position and detector 102 may then signal to control 103. This may turn off motor 105 and stop vehicle window 106 in the predetermined position.

Manual switch 107 and 108 provide manual operation of the motor for normal operation. Manual switch 107 may be a switch at a driver's console containing switches for controlling all the windows in the vehicle. Manual switch 108 may be a local switch located by the vehicle window 106 possibly on the corresponding door of the vehicle window 106. Manual switch 107 is coupled to control 103. Manual switch 107 may control the position of window 106 as long as the feature switch is not switched. Control 103 is coupled to manual switch 108, and manual switch 108 is coupled to motor 104. Manual switch 108 may interrupt the movement of the vehicle window 106 whether controlled by manual switch 107 or alternately by detector 102. This may provide an additional level of control to the passenger.

Additionally, control 103 may include limiting circuit 110. Limiting circuit 110 may limit the current being supplied to motor 104. The limiting of the current may reduce the amount of torque motor 104 supplies when closing window 106. This may help to reduce the force in which the vehicle window is moved. This may help to improve safety when the vehicle window 106 is closing. Also limiting circuit 110 may limit the voltage and current. This would limit the speed as well as the force of the movement of the vehicle window 106.

Figure 2:
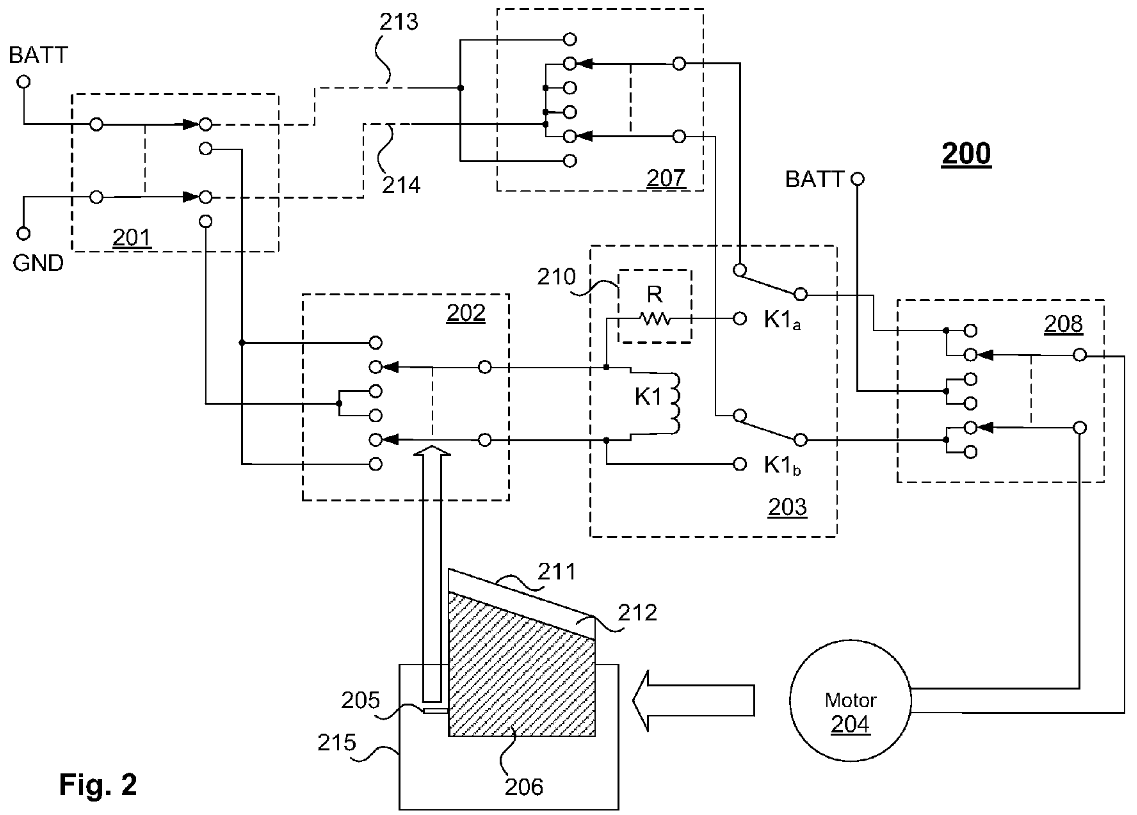
FIG. 2 illustrates a vehicle window apparatus according to one embodiment of the present invention.

FIG. 2 illustrates a vehicle window apparatus 200 according to one embodiment of the present invention. Vehicle window apparatus 200 includes feature switch 201, detector 202, control circuit 203, motor 204, position feature 205, vehicle window 206, manual switch 207, manual switch 208, and limiting circuit 210. In this embodiment, feature switch 201 selectively couples battery power (i.e. BATT) and ground return (i.e. GND) to manual switch 207 through connection 213 and 214.

Vehicle window apparatus 200 shows the switches in a normal mode in which the manual switches may be used to open or close the vehicle window 206. Vehicle window 206 is shown in the predetermined position within window frame 211. In this position, the vehicle window 206 and window frame 211 form opening 212. Position feature 205 is a protrusion in this embodiment. This protrusion may be a tab attached to the window 206 or may be formed as part of the window 206. Detector 202 in this embodiment is a double pole double throw center off switch. The switch of detector 202 may be attached to a frame 215. The movement of the window position may be sensed from the perspective of frame 215.

The position feature 205 establishes the position of the vehicle window prior to the switching of feature switch 201. If the vehicle window moves in a closing direction out of a predetermined position, position feature 205 switches the switch of detector 202 to a setting which may selectively power motor 205 in the opening direction. If the vehicle window moves in a closing direction into the predetermined position, position feature 205 switches the switch of detector 202 to a setting which may selectively remove power from motor 205 and stop the moving of the window 206. If the vehicle window moves in an opening direction out of a predetermined position, position feature 205 switches the switch of detector 202 to a setting which may selectively power motor 205 in the closing direction. If the vehicle window moves in the opening direction into the predetermined position, position feature 205 switches the switch of detector 202 to a setting which may selectively power motor 205 in the closing direction.

After feature switch 201 is switched, the battery power (i.e. BATT and GND) is coupled to detector 202. The setting of the switch of detector 202 couples power to control 203 according to the direction of the vehicle window may need to move in order change the position of the vehicle window position to the predetermined position.

Control 203 includes a relay (K1) and a resistor 210. Resistor 210 acts as a power limiter to the motor. The power signal provided by the detector energizes the coil of relay K and switches pole K1*a* and K1*b* so that the incoming power signal is coupled to manual switch 208 and the power signal from manual switch 207 is decoupled from manual switch 208. If manual switch 208 is not being switched and remains in the setting shown, the power signal from the detector is coupled to motor 204.

The power signal drives motor 204 and in turn the motor moves vehicle window 206 and position feature 205. When the vehicle window 206 reaches the predetermined position, position feature 205 (i.e. the tab in this embodiment) switches the switch of detector 202 into the setting shown, and the power is interrupted to motor 204. Motor 204 stops vehicle window 206 in the predetermined position as a result. Delays may allow for some tolerances to the predetermined position. The value of resistor 210 may allow for the voltage to be limited and may slow the movement of the vehicle window 206 such that the tolerance of the predetermined position may be reduced.

In another embodiment, two double pole single throw switches replace the double pole double throw center off switch. In this case, each switch may be switched to a setting as the window moves. For example, a window moves vertically to open and close. In this embodiment, a position feature such as a tab or other protrusion may be used to change the setting of switches A and B. Switch A is placed above switch B such that the protrusion switches each switch as it passes the switch. Switch B is switched into a first setting if the vehicle window moves in a closing direction into the predetermined position. Switch A is switched into a first setting if the vehicle window moves in the closing direction out of the predetermined position. Switch B is switched into a second setting if the vehicle window moves in an opening direction out of the predetermined position. Switch A is switched into a second setting if the vehicle window moves in the opening direction into the predetermined position. The combinations are summarized in the table below.

| Switch A | Switch B | Condition |
|---|---|---|
| 1 | 1 | above predetermined position |
| 1 | 2 | not allowed |
| 2 | 1 | at predetermined position |
| 2 | 2 | below predetermined position |

Figure 3:
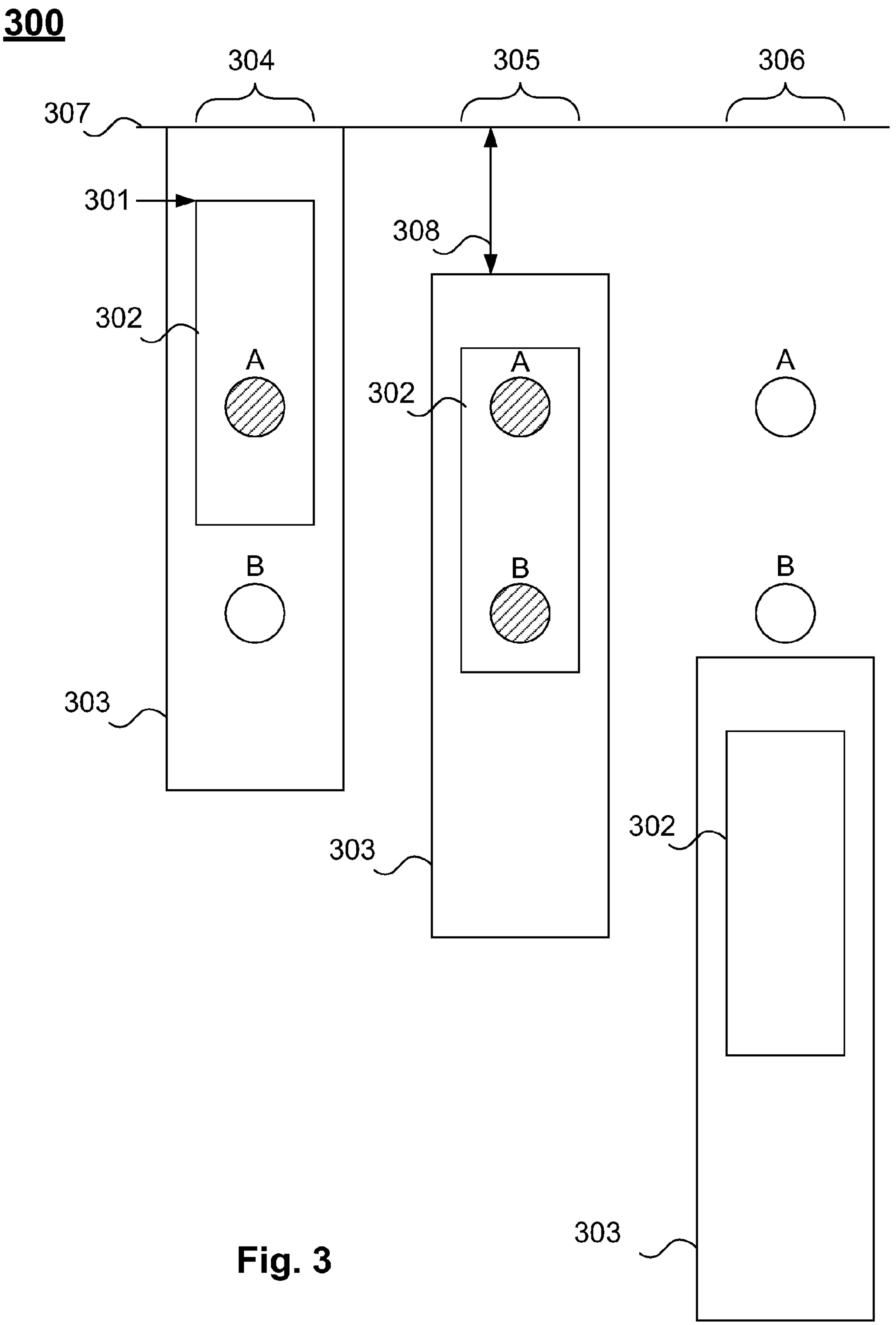
FIG. 3 illustrates different positions of a vehicle window and a position feature according to one embodiment of the present invention.

FIG. 3 illustrates different positions (304, 305, and 306) of a vehicle window 303 and a position feature 302 according to one embodiment of the present invention. The positions represent three possible positions of vehicle window 303 relative to sensor A and sensor B. The possible combinations of sensor values are summarized in the table below.

| Sensor A | Sensor B | Condition | Figure reference |
|---|---|---|---|
| on | on | below predetermined position | 306 |
| on | off | below predetermined position | not shown |
| off | on | above predetermined position | 304 |
| off | off | at predetermined position | 305 |

Sensor A and B may be optical sensors utilizing light emitting diodes. In this case, the position feature 302 may be an opaque region on the glass or a decal added to the glass of the window 303 in order to reduce the transmission of light waves at this location. Position feature 303 may also be a result of etching the glass of window 303.

At position 304 the window 303 is fully closed and position feature 302 blocks the light for sensor A only. Window frame 307 indicates the limit to upward travel of window 303. Notice that position feature 302 may be located almost anywhere on the window where sensors A and B may be able to be mounted on the frame of the window mechanism or door. The sensing of the window position is relative to the placement of the sensors according to the position feature.

Position 305 is the predetermined position. The predetermined position is a position that is a distance 308 from window frame 307. This is the position in which position feature 303 blocks the light for both sensor A and B. The dimensions of the position feature and the speed of the window movement may need to be designed to compensate for delays in the window movement. Also the spacing of the sensors may need to be adjusted to compensate for window speed and system response.

Position 306 is below the predetermined position. This is the position in which position feature 303 does not block the light for either sensor A and B. The vehicle window 303 is also below the predetermined position when only sensor B is blocked. Depending on the spacing between the sensors, this condition may be utilized to slow the window movement prior to stopping the window. This may allow for a fast window movement up to a threshold in which window movement may be slowed.

Figure 4:
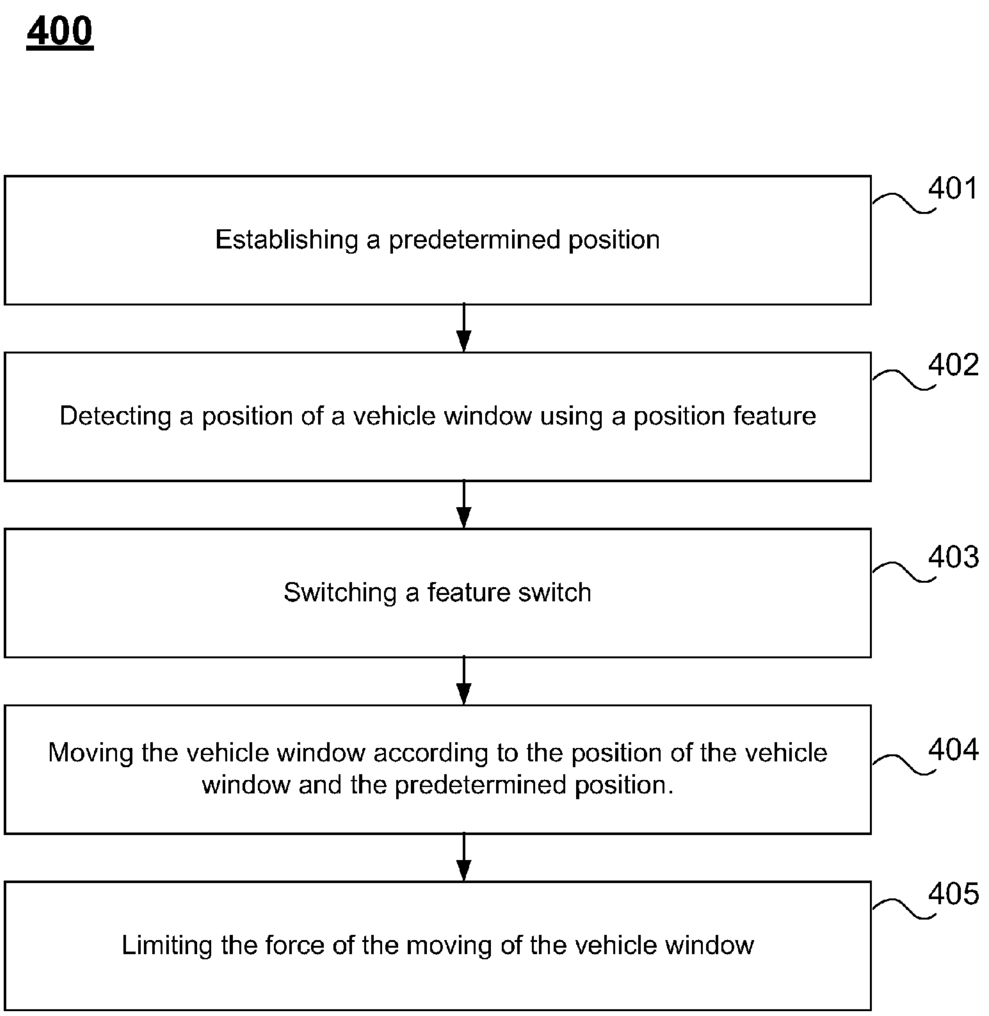
FIG. 4 illustrates a method according to one embodiment of the present invention.

FIG. 4 illustrates a method 400 according to one embodiment of the present invention.

At 401, a predetermined position is established. This may be designed to be set by physical placement of sensors, actuators, position features, or any combination herein. An example of predetermined positions which may be fixed in the design of the window apparatus are described above. Other designs may incorporate predetermined positions which may be altered by a user. For example, an optical sensor may read a complex position features in order to determine the position of the vehicle window such that a user may have several choices to select the predetermined position.

At 402, a position feature is used to detect a position of a vehicle window. Examples of position features have been described above. The position feature need not be attached to the window itself. For example, a position feature may be attached to a mechanical member whose position corresponds to the position of the vehicle window.

At 403, the feature switch is switched. The feature switch may be a manual button or toggle switch. The feature switch may be a transistor located in a controller such as an open collector switch, for example.

At 404, the vehicle window moves according to the position of the vehicle window and the predetermined position. For example, if the window needs to be closed in order to move the window into the predetermined position, a mechanism may move the window in the closing direction. When the window reaches the predetermined position the mechanism may stop moving the window.

At 405, the force of the moving of the vehicle window is limited. If the window were being moved by an electric motor, the current to the electric motor may be limited in order to limit the amount of torque the motor provides. The reduced torque of the motor rotation may translate into reduced force in the movement of the vehicle window. The limiting of the force may be a set value or may be adjusted according to certain conditions concerning the movement of the window. For example, a window is in the fully open position and the feature switch is switched. The vehicle window may begin closing with normal force, but as the vehicle window continues to close and the corresponding opening begins to reduce the force of the window movement may diminish. This may be helpful as the opening approaches the size of a child's head or a human limb. This may be an opening 8 inches or less.

Figure 5:
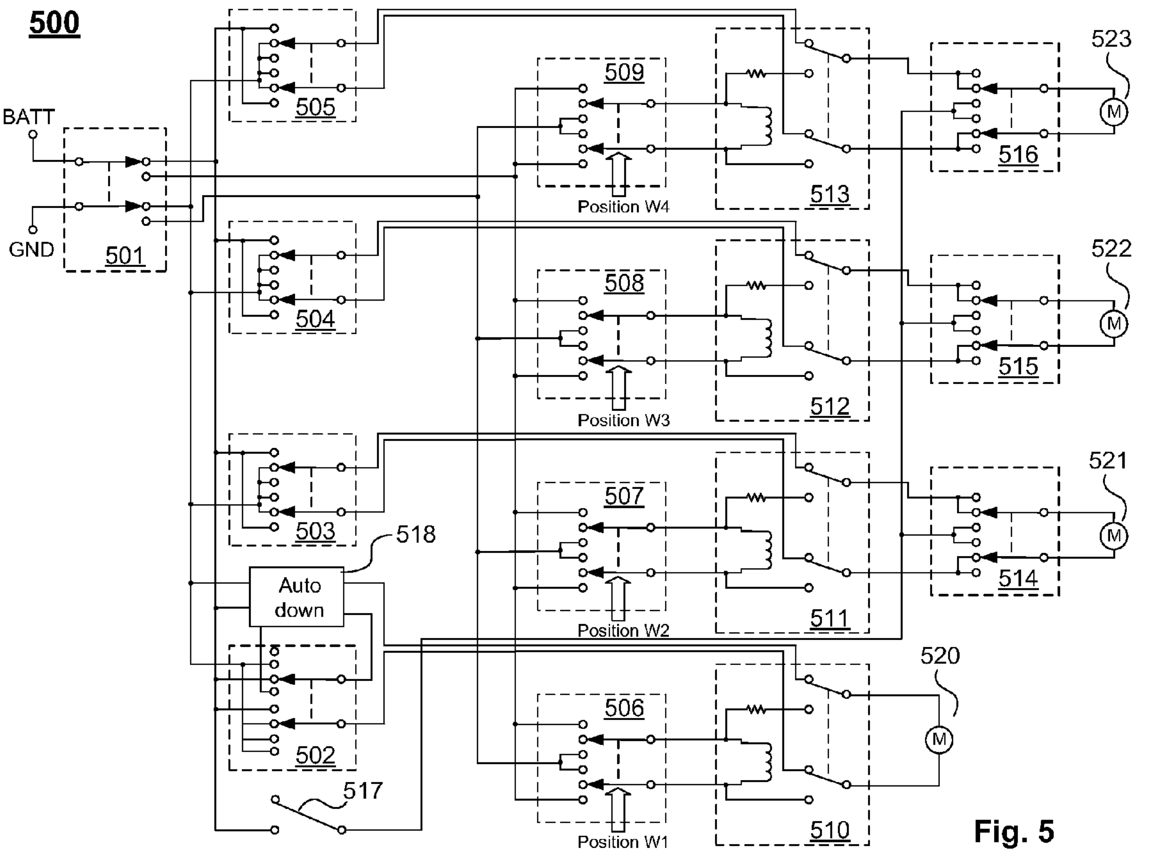
FIG. 5 illustrates a system according to one embodiment of the present invention.

FIG. 5 illustrates a system 500 according to one embodiment of the present invention. System 500 includes feature switch 501, manual switches 502-505 and 514-516, auto down circuit 518, detector switches 506-509, control circuits 510-513, motors 520-523, and window lock 517. System 500 is designed for a four window automobile system, but the circuit may be modified to incorporate any number of vehicle windows. This system utilizes an apparatus duplicated for each of the windows. This apparatus is similar to apparatus 200 described in FIG. 2 above.

The drivers control panel may include manual switches 502-505, auto down circuit 518, and window lock 517. Manual switch 502, auto down circuit 518, detector switch 506, control circuit 510, and motor 520 correspond to the driver's window. Manual switch 503, detector switch 507, control circuit 511, manual switch 514, and motor 521 correspond to the front right passenger window. Manual switch 504, detector switch 508, control circuit 512, manual switch 515, and motor 522 correspond to the left rear passenger window. Manual switch 505, detector switch 509, control circuit 513, manual switch 516, and motor 523 correspond to the right rear passenger window.

Feature switch 501 is shown in a normal state in which power is provided to the driver's manual switches (i.e. manual switches 502-505). The window lock 517 is shown in an open position, but if it were closed the local manual switches 514-516 would also have power. The auto down circuit is used to open the driver's window to a fully open position. Detector switches 506-509 are all in the setting corresponding to each window being in the predetermined position. As the passengers move each of their respective windows from the predetermined position, the detector switches switch settings based on the new position of the windows. The changing of the settings for each window is accomplished by the use of a position feature corresponding to each window. Position W1-W4 illustrates the input from the position feature. The position feature has been described in detail above.

When the feature switch is switched, the power is diverted from the driver's control panel (i.e. manual switches 502-505, window lock 517, and auto down circuit 518) to the detector switches 506-509. Depending on the position of each window (i.e. Position W1-W3) each detector switch will provide power to move each window in the direction of the predetermined position. The movement of the windows in this embodiment is performed simultaneously. Control circuit 510-513 couple the power signal provided by detector switches 506-509 (respectively) to motors 520-523 (respectively). Each controller may divert the shorting connection from the driver's control panel to the power signal provided by the corresponding detector switches and provide some current limiting for each power signal. This may be done in a similar manner described above for apparatus 200 of FIG. 2. As each window reaches the predetermined position, the corresponding detector switches are switched into the setting shown in FIG. 5. This setting stops the motor. Now that the windows are all in the predetermined position, the feature switch may be switched back to the normal manual setting. In other embodiments the feature switch may be set for a period of time to give all the windows time to reach the predetermined position, and then the switch may be automatically reset into the normal setting.

Figure 6:
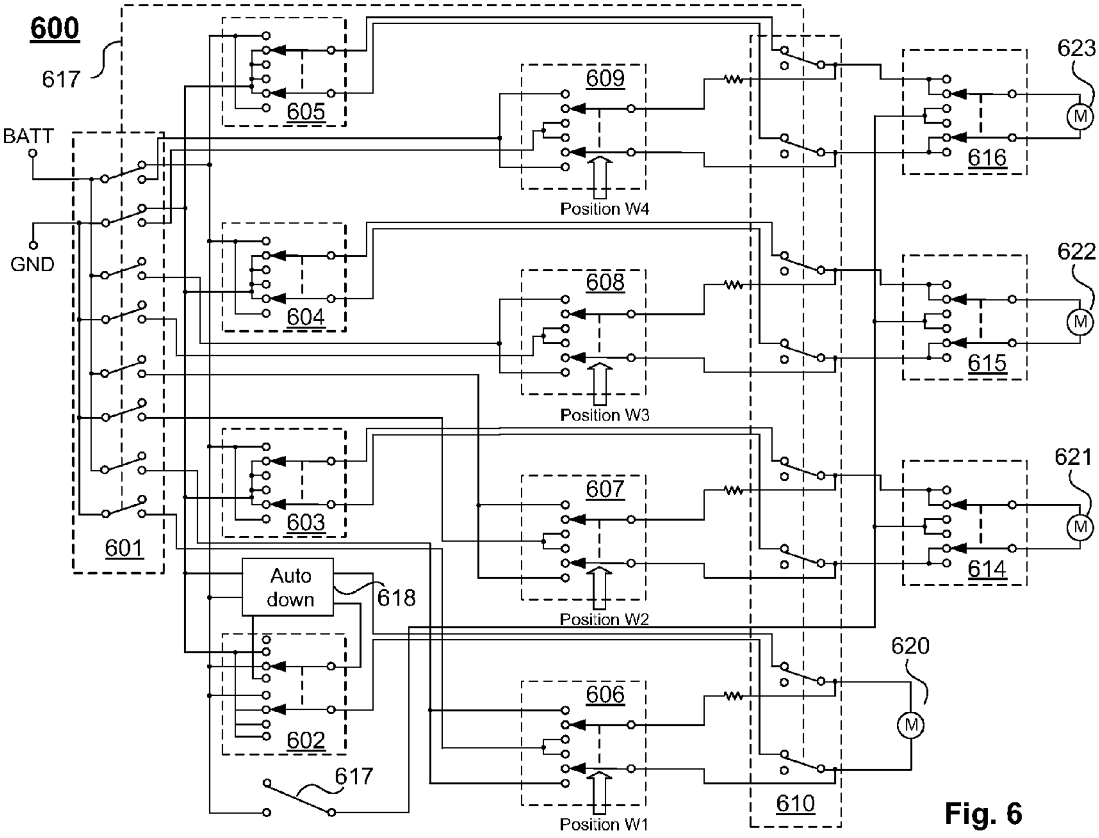
FIG. 6 illustrates a system according to one example of the present invention.

FIG. 6 illustrates a system 600 according to one example of the present invention. System 600 includes manual switches 602-605 and 614-616, auto down circuit 618, detector switches 606-609, motors 620-623, and window lock 617 which correspond to manual switches 502-505 and 514-516, auto down circuit 518, detector switches 506-509, motors 520-523, and window lock 517 of system 500 of FIG. 5. This example illustrates a manner in which the control circuits 610 are now ganged together 617 with the feature switch 601. This example has no relays and the feature switch directly redirects the power signal from each of the detector switches (i.e. 606-609).

Figure 7:
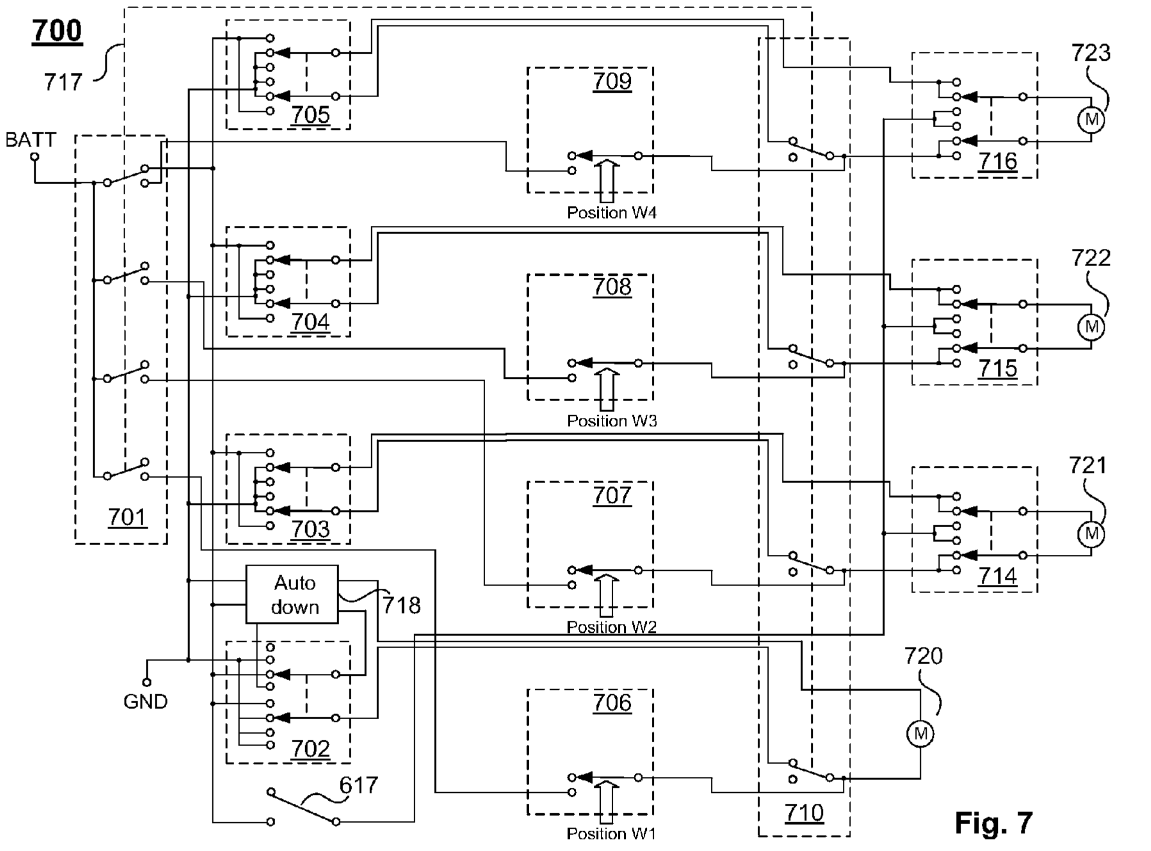
FIG. 7 illustrates a system according to one example of the present invention.

FIG. 7 illustrates a system 700 according to one example of the present invention. System 700 includes manual switches 702-705 and 714-716, auto down circuit 718, motors 720-723, and window lock 717 which correspond to manual switches 602-605 and 614-616, auto down circuit 618, motors 620-623, and window lock 617 of system 600 of FIG. 6. This example illustrates a manner in which the control circuits 710 are now ganged together 717 with the feature switch 701 and the windows may only be opened to the predetermined position. This example has no relays and the feature switch directly redirects the power signal from each of the detector switches (i.e. 706-709). Also, this example limits the number of switches necessary for implementation and therefore may reduce cost.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A vehicle window apparatus comprising:
- a position feature corresponding to a position of a vehicle window;
- a detector coupled to use the position feature and coupled to provide at least one signal corresponding to a movement of the vehicle window to a predetermined position;
- a feature switch coupled to the detector; and
- a motor coupled to provide the movement of the vehicle window according to the at least one signal provided by the detector, the movement resulting from the switching of the feature switch,
- wherein the predetermined position is a position between a fully closed position and a fully open position,
- wherein the detector includes a switch,
- wherein the switch is switched into a first setting if the vehicle window moves in a closing direction out of the predetermined position,
- wherein the switch is switched into a second setting if the vehicle window moves in the closing direction into the predetermined position,
- wherein the switch is switched into a third setting if the vehicle window moves in an opening direction out of the predetermined position,
- wherein the switch is switched into the second setting if the vehicle window moves in the opening direction into the predetermined position,
- wherein the position feature movement is used to change the setting of the switch.

2. The apparatus of claim 1 wherein the predetermined position of the vehicle window forms a partial opening that is less than one inch from the fully closed position.

3. The apparatus of claim 1 wherein the position feature alters the transmission of light through at least one portion of the vehicle window, wherein other portions of the vehicle window, that do not have the position feature, pass light in a uniform manner.

4. The apparatus of claim 3 wherein the position feature includes at least one opaque region.

5. The apparatus of claim 4 wherein the at least one opaque region includes a decal, wherein the detector includes a light emitting diode.

6. The apparatus of claim 3 wherein the position feature includes at least one etched region of the vehicle window.

7. The apparatus of claim 1 further comprising a limiting circuit coupled between a voltage source and the motor,
- wherein the limiting circuit alters attributes corresponding to the movement of the vehicle window.

8. The apparatus of claim 1 wherein the position feature is a protrusion from the vehicle window.

9. The apparatus of claim 8 wherein the protrusion is a tab attached to the vehicle window.

10. The apparatus of claim 1 wherein the first position of the switch selectively provides power to the motor such that the vehicle window opens toward the predetermined position,
- wherein the third position of the switch selectively provides power to the motor such that the vehicle window closes toward the predetermined position,
- wherein the second position of the switch selectively provides no power to the motor such that the vehicle window stops moving and, in accordance therewith, maintains the predetermined position.

11. The apparatus of claim 1, further comprising:
- a plurality of vehicle window apparatus,
- wherein the feature switch is coupled to the detector of each vehicle window apparatus,
- wherein each movement of each vehicle window of each vehicle window apparatus occurs simultaneously.

12. The apparatus of claim 1, further comprising a resistor coupled to the motor configured to limit power to the motor to slow the movement of the vehicle window.

13. A vehicle window apparatus comprising:
- a position feature corresponding to a position of a vehicle window;
- a detector coupled to use the position feature and coupled to provide at least one signal corresponding to a movement of the vehicle window to a predetermined position;
- a feature switch coupled to the detector; and
- a motor coupled to provide the movement of the vehicle window according to the at least one signal provided by the detector, the movement resulting from the switching of the feature switch,
- wherein the predetermined position is a position between a fully closed position and a fully open position,
- wherein the detector includes a first switch and a second switch,
- wherein the first switch is switched into a first setting if the vehicle window moves in a closing direction into the predetermined position,
- wherein the second switch is switched into a first setting if the vehicle window moves in the closing direction out of the predetermined position,
- wherein the first switch is switched into a second setting if the vehicle window moves in an opening direction out of the predetermined position,
- wherein the second switch is switched into a second setting if the vehicle window moves in the opening direction into the predetermined position,
- wherein the position feature movement is used to change the setting of the first switch and the second switch.

14. The apparatus of claim 13 wherein the predetermined position has a tolerance associated with a distance between the first switch and the second switch.

15. The apparatus of claim 13, further comprising a resistor coupled to the motor configured to limit power to the motor to slow the movement of the vehicle window.

16. A method for adjusting a vehicle window comprising:
- detecting a position of a vehicle window using a position feature;
- switching a feature switch;
- moving the vehicle window to a predetermined position as a result of the switching of the feature switch, the moving corresponding to the position of the vehicle window, wherein the predetermined position is a position between a fully closed position and a fully open position, wherein the detecting includes switching a switch into a first setting if the vehicle window moves in a closing direction out of the predetermined position, switching the switch into a second setting if the vehicle window moves in the closing direction into the predetermined position, switching the switch into a third setting if the vehicle window moves in an opening direction out of the predetermined position, and switching the switch into the second setting if the vehicle window moves in the opening direction into the predetermined position, wherein the position feature movement is used to change the setting of the switch.

17. The method of claim 16 wherein the position feature alters the transmission of light through at least one portion of the vehicle window, wherein other portions of the vehicle window, that do not have the position feature, pass light in a uniform manner.

18. The system of claim 17 wherein the position feature reduces the transmission of light, the detecting further comprising sensing the light passing through the position feature at a location relative to a framework of a mechanism used in the moving of the vehicle window.

19. The system of claim 16 further comprising limiting the force of the moving of the vehicle window.

20. The method of claim 16, further limiting power to the motor to slow the movement of the vehicle window.

21. A method for adjusting a vehicle window comprising:

detecting a position of a vehicle window using a position feature;

switching a feature switch;

moving the vehicle window to a predetermined position as a result of the switching of the feature switch, the moving corresponding to the position of the vehicle window, wherein the predetermined position is a position between a fully closed position and a fully open position, wherein the detecting includes switching a first switch into a first setting if the vehicle window moves in a closing direction into the predetermined position, switching a second switch into a first setting if the vehicle window moves in the closing direction out of the predetermined position, switching the first switch into a second setting if the vehicle window moves in an opening direction out of the predetermined position, and switching the second switch into a second setting if the vehicle window moves in the opening direction into the predetermined position, wherein the position feature movement is used to change the setting of the first switch and the second switch.

22. The method of claim 21, further comprising limiting power to the motor to slow the movement of the vehicle window.

* * * * *